(12) United States Patent
Elstorpff

(10) Patent No.: US 8,860,566 B2
(45) Date of Patent: Oct. 14, 2014

(54) DEVICE FOR MONITORING THE LINING THICKNESS OF A BRAKE LINING OF A FRICTION BRAKE OF A VEHICLE

(75) Inventor: Marc-Gregory Elstorpff, Munich (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 206 days.

(21) Appl. No.: 12/867,065

(22) PCT Filed: Feb. 20, 2009

(86) PCT No.: PCT/EP2009/001255
§ 371 (c)(1),
(2), (4) Date: Aug. 11, 2010

(87) PCT Pub. No.: WO2009/106274
PCT Pub. Date: Sep. 3, 2009

(65) Prior Publication Data
US 2011/0012724 A1  Jan. 20, 2011

(30) Foreign Application Priority Data

Feb. 27, 2008 (DE) .......................... 10 2008 011 288

(51) Int. Cl.
*B60Q 1/00* (2006.01)

(52) U.S. Cl.
USPC ......... 340/454; 340/5.72; 340/524; 340/5.61; 340/10.1; 340/572.3; 340/505; 188/1.11 R; 701/30.1; 701/1; 701/29.1; 701/31.9

(58) Field of Classification Search
USPC .............. 340/10.1, 505, 454, 442, 5.61, 5.72, 340/572.3, 524; 303/191, 7; 246/169 R; 188/1.11, 73.38; 701/30.1, 29.1, 31.1, 701/1
See application file for complete search history.

(56) References Cited

U.S. PATENT DOCUMENTS 5,201,834 A * 4/1993 Grazioli et al. ........... 246/169 R
5,646,592 A * 7/1997 Tuttle ......................... 340/545.6
6,655,502 B2 12/2003 Sokoll
(Continued)

FOREIGN PATENT DOCUMENTS

| DE | 10029238 | 12/2001 |
|----|----------|---------|
| DE | 102006042777 B3 | 10/2007 |
| JP | 2004205437 A | 7/2004 |
| WO | 2004059248 A1 | 7/2004 |

OTHER PUBLICATIONS

International Search Report mailed Jul. 14, 2009 for International Patent Application No. PCT/EP2009/001255.

*Primary Examiner* — Benjamin C Lee
*Assistant Examiner* — Chico A Foxx
(74) *Attorney, Agent, or Firm* — Barnes & Thornburg LLP

(57) ABSTRACT

A device for monitoring the lining thickness of a brake lining of a friction brake of a vehicle is disclosed, wherein the brake lining interacts with a friction partner, such as a brake disk. The brake lining is equipped with at least one passive transponder of an RFID system, wherein the passive transponder is changed and/or destroyed once the brake lining has reached a defined wear threshold as a result of contact with the friction partner or with an element that is guided by the friction partner, such that the transponder transmits a signal that differs from an expected signal, or no signal, to a reading unit of the RFID system after being illuminated by the reading unit.

16 Claims, 2 Drawing Sheets

(56) References Cited

U.S. PATENT DOCUMENTS

| | | |
|---|---|---|
| 2002/0116992 A1 | 8/2002 | Rickel |
| 2003/0010582 A1* | 1/2003 | Denton et al. ............. 188/73.38 |
| 2003/0173408 A1* | 9/2003 | Mosher et al. ................ 235/492 |
| 2004/0206584 A1* | 10/2004 | Bihn ........................ 188/1.11 L |
| 2005/0212357 A1* | 9/2005 | Adams .................... 303/122.03 |
| 2006/0042734 A1* | 3/2006 | Turner et al. ............... 152/154.2 |
| 2006/0149440 A1* | 7/2006 | Pettersson et al. ............. 701/30 |
| 2006/0232392 A1* | 10/2006 | Emmett et al. ................ 340/454 |
| 2006/0273148 A1* | 12/2006 | Karstens ...................... 235/375 |
| 2010/0253497 A1* | 10/2010 | Bakker et al. ................ 340/454 |

\* cited by examiner

DEVICE FOR MONITORING THE LINING THICKNESS OF A BRAKE LINING OF A FRICTION BRAKE OF A VEHICLE

CROSS-REFERENCE TO RELATED APPLICATIONS

The present application claims the benefit of priority to International Patent Application No. PCT/EP2009/001255 filed 20 Feb. 2009, which further claims the benefit of priority to German Patent Application No. 10 2008 011 288.7 filed 27 Feb. 2008, the contents of which are incorporated herein by reference in their entirety.

BACKGROUND

The embodiments of this disclosure relate to an apparatus for monitoring the lining thickness of a brake lining in a friction brake on a vehicle, wherein the brake lining interacts with a friction partner such as a brake disk.

Such an apparatus is described by way of example in DE 100 29 238 A1. In this document, the wear state of the brake is sensed either by using an electrically conductive wiper contact integrated in a brake lining or alternatively by fitting a wear sensor having internal wiper contacts separately in or on the brake lining. If the amount of wear on the brake lining is critical or if the wear sensor is exposed, an electrically conductive contact point comes into contact with the brake disk, for example, which brings about an electrical short, or an electrical contact loop is broken, i.e., an externally impressed flow of electric current is broken. However, this requires a supply of power to the wear sensors via the vehicle. In vehicles such as goods wagons, which do not have a dedicated power supply, such an approach is ineffective, however.

SUMMARY

Embodiments of this disclosure provide apparatus for monitoring the lining thickness of a brake lining in a friction brake on a vehicle of the type mentioned at the outset such that it is possible to reach at least one defined amount of wear with little complexity and cost even in non-electrified vehicles. Additionally, a method for using the apparatus is provided.

Embodiments of the disclosure are based on the idea that the brake lining whose wear state or amount of wear is to be monitored is provided with a passive transponder in an RFID system. This passive transponder is altered, damaged or destroyed through contact with the friction partner when at least one defined admissible wear limit for the brake lining is reached such that, following illumination by a reader in the RFID system, it sends a signal which has been altered in comparison with an expected signal or no signal to the reader.

A passive transponder in a Radio Frequency Identification System (RFID) is known not to require a dedicated power supply in order to perform its function. To the contrary, the reader in the RFID system produces a radio-frequency electromagnetic alternating field which illuminates the antenna of the RFID transponder. As soon as an antenna coil of the transponder is detected by the electromagnetic field of the reader, the antenna coil produces an induction current. This induction current is rectified and, hence, a capacitor is charged as a short-term store which undertakes the supply of power to a microchip for the read operation. The microchip activated in this manner in the transponder receives commands from the reader, which modulates this into its electromagnetic field. The microchip produces a response and modulates the field emitted by the reader via field attenuation in the contact-free short circuit or reflection.

Such a transponder consequently comprises a microchip, an antenna, a carrier or housing and an energy source, which in the case of passive transponders is formed by a capacitor. Passive transponders, therefore, obtain their power for supplying the microchip from the received electromagnetic waves (continuous wave) from the reader. The capacitor that supplies the microchip with electrical power is charged using the antenna coil through induction in a similar manner to in a transformer. On account of the low capacitance of the capacitor, the continuous wave needs to be sent continuously by the reader while the transponder is in the reading or illumination range.

If the admissible amount of wear on the brake lining has therefore been reached, the friction partner or an element carried along with it comes into mechanical contact with the passive transponder fitted on or in the brake lining, as a result of which the passive transponder has its function either altered, damaged or completely destroyed. In the first case, that is to say if the passive transponder is still operational, the signal fed back by it is altered in comparison with a signal generated in the intact or unaffected state. In the second case, the destruction of the transponder means that it is no longer able to feed back any signal to the reader. If, by contrast, the admissible amount of wear on the brake lining has not yet been reached and the passive transponder has therefore not yet come into contact with the friction partner, it has not yet changed the signal response expected from it.

As a result, the assessment of whether or not a defined admissible amount of wear on a brake lining equipped with a passive transponder of this kind has been reached can be made based on the signal fed back from the transponder to the reader.

The particular advantage of the invention is that passive transponders of this kind, as already described above, obtain their power from the reader and therefore the vehicle whose amount of wear on its brakes is to be monitored does not need to have a power supply. One application, therefore, relates to rail vehicles, particularly goods wagons without a dedicated power supply. However, it is also possible for electrified vehicles or road vehicles such as commercial vehicles or automobiles to be equipped with an apparatus according to the invention.

In addition, it is also unnecessary to provide any further wiring systems on or in the brake lining for the purpose of transmitting data or supplying power, which makes the production of such brake linings very inexpensive. Furthermore, simple passive transponders of this kind are very cheap electronic units.

Additionally, an explicitly defined signal is produced in relation to systems which continuously measure wear, which means that the tendency toward evaluation errors is low.

In line with one embodiment of the disclosure, the passive transponder may be integrated in the brake lining or fitted on the brake lining such that it can come into mechanical contact with the friction partner.

In accordance with one implementation, the reader interacts with an evaluation device, which generates a wear information item about the wear state of the brake lining based on the signal fed back or not fed back from the transponder to the reader.

In addition, an indicator device interacting with the evaluation device may be provided for the purpose of indicating the wear information about the wear state of the brake lining.

More precise details can be obtained from the following description of disclosure embodiments.

BRIEF DESCRIPTION OF THE FIGURES

Exemplary embodiments of the disclosure are subsequently shown in the drawings and explained in more detail in the description below.

DETAILED DESCRIPTION

Figure 1:
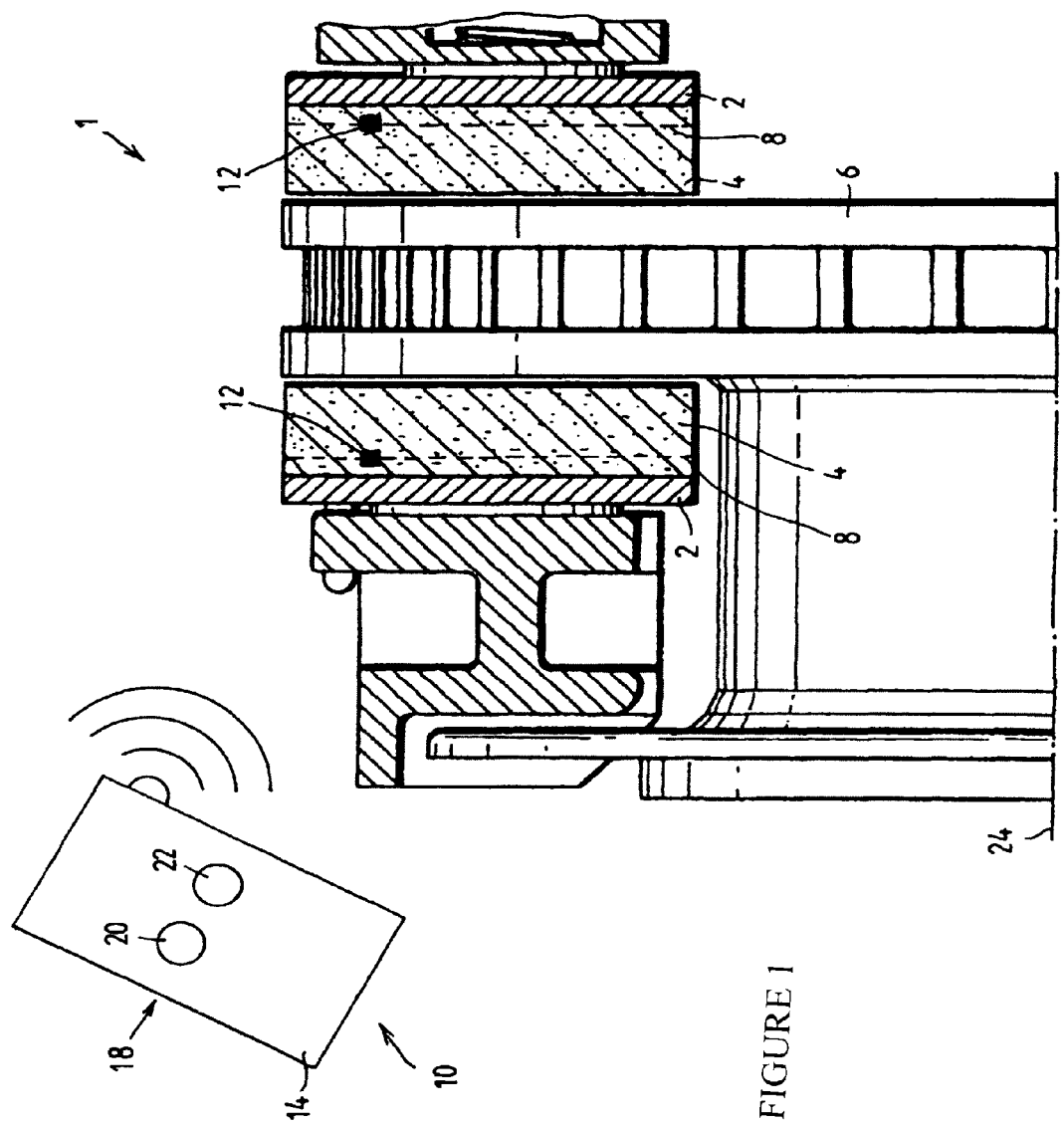
FIG. 1 illustrates an apparatus for monitoring the lining thickness of a brake lining in a friction brake on a vehicle in accordance with an embodiment of the disclosure.

FIG. 1 shows a friction brake 1 on a rail vehicle, particularly a goods wagon, by way of example in the form of a disk brake, having a brake disk 6, which is interposed between two brake linings 4 carried by brake lining carriers 2. To apply the friction brake 1, the brake linings 4 are brought into frictional engagement with the brake disk 6 by a brake mechanism—which is not central to the disclosed embodiments.

After some time of brake use, both the brake disk 6 and the brake linings 4 wear by virtue of the lining thickness or lining depth decreasing. To avoid direct frictional contact between the brake lining carriers 2 and the brake disk 6, the brake linings 4 must be worn down only to no more than a prescribed admissible amount of wear 8, which is symbolized in FIG. 1 by a dashed line in each case.

To monitor whether or not the brake linings 4 have reached the admissible amount of wear 8 already, FIG. 1 shows an apparatus 10 for monitoring the lining thickness of the brake linings 4 in a preferred embodiment.

The brake linings 4 are respectively provided with a passive transponder 12 in an RFID system, the passive transponders 12 being altered, damaged or destroyed through contact with the brake disk 6 when the admissible amount of wear 8 on the brake linings 4 is reached such that, following illumination by a reader 14 in the RFID system, they send a signal which has been altered in comparison with an expected signal or no signal to the reader 14.

Figure 2:
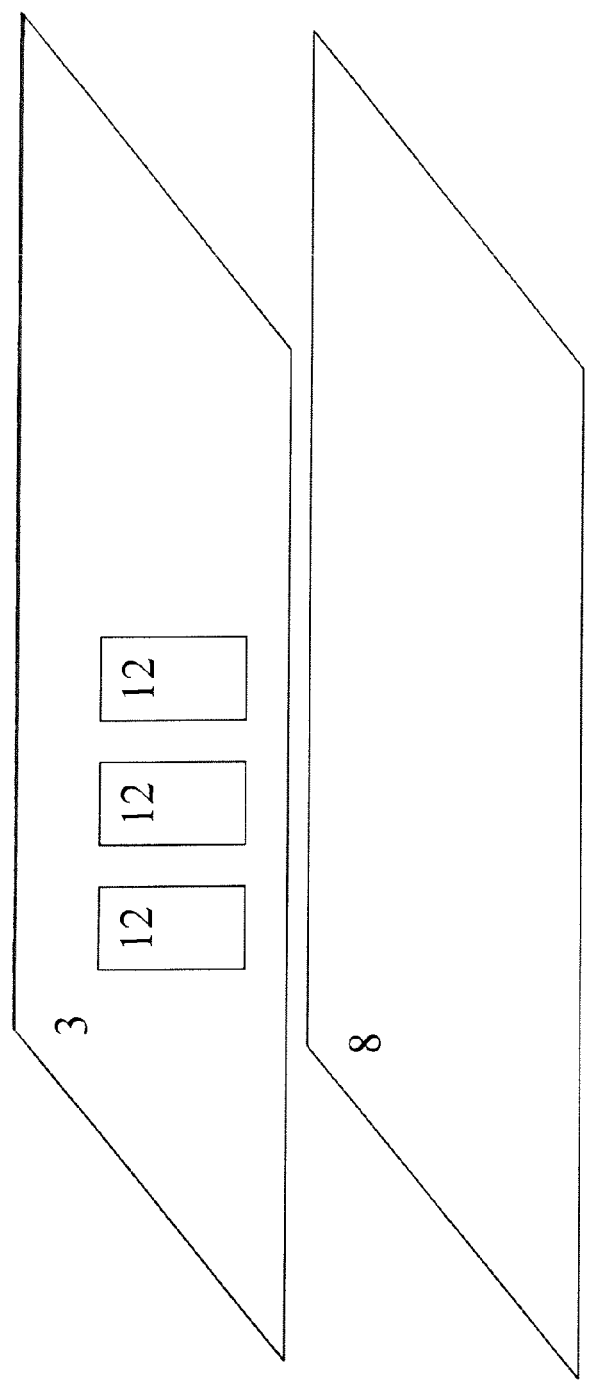
FIG. 2 illustrates an alternative representation of components of the apparatus illustrated in FIG. 1.

To this end, as illustrated in FIG. 2, the passive transponders 12 are preferably arranged in a plane 3 that is parallel to a contact face 5 of the brake linings 4 which faces the brake disk 6. This plane 3 has the admissible amount of wear 8 denoted by the dashed line in FIG. 1. As such, the plane 3 is perpendicular to the direction of wear illustrated and referenced herein with respect to FIG. 1.

The effect of this is that if the brake linings 4 is worn down to this amount of wear 8 in the direction of wear, one alternative is that the respectively affected passive transponder 12 is damaged by the frictional contact with the brake disk 6 such that, although it can still feed back a signal to the reader 14, the signal differs from an expected signal which an operational and undamaged transponder 12 would emit.

Alternatively, a transponder 12 could drop out of the brake lining 4 as a result of frictional contact with the brake disk 6 and hence fall off the brake lining 4 or be destroyed completely, so that, following illumination of the relevant brake lining 4 by the reader 14, it is no longer able to feed back a signal.

Consequently, the assessment of whether or not the admissible amount of wear 8 on the brake linings 4 equipped with passive transponders 12 of this kind has been reached is made based on the signal fed back from the respective transponder 12 to the reader 14. In this context, it may arise that the brake linings 4 are not worn down evenly and the signal from the transponder 12 associated with the one brake lining 4 has altered in comparison with the expected signal or is no longer present at all on account of it already being in contact with the brake disk 6, while the signal from the transponder 12 associated with the other brake lining 4 still corresponds to the expected signal because the admissible amount of wear 8 has not been reached.

However, since the range of passive transponders 12, as are used in the invention, is relatively short (between a few millimeters and a few centimeters), it is already necessary to place the reader 14 relatively close to the brake lining 4 which is to be examined in order to obtain a feedback signal. It is, therefore, possible to preclude the signal from the transponder 12 associated with the one brake lining 4 from being incorrectly attributed to the transponder 12 from the other brake lining 4. Alternatively, however, it is also possible to equip only one of the two brake linings 4 with a passive transponder 12 and then to replace both brake linings 4 as a preventive measure when the amount of wear 8 on the relevant brake lining 4 has been reached.

The reader 14 interacts with an optionally integrated evaluation device 16 which generates an information item about the instantaneous wear state of the brake lining 4 on the basis of the signal fed back or not fed back from the respective passive transponder 12 to the reader 14. In addition, an indicator device 18, which interacts with the evaluation device 16 and which is likewise preferably integrated in the reader 14 is provided for the purpose of indicating the wear information about the wear state of the examined brake lining 4. By way of example, this wear information can be reproduced visually by colored LED lamps, with a lit green LED lamp 20 representing a brake lining 4 which has not yet been worn down to the admissible amount of wear 8, for example, and a lit red LED lamp 22 representing a brake lining 4 which has already been worn down to the admissible amount of wear 8. Alternatively, or in addition, the wear information could also be stored in a memory of the reader 14 and read when the rail vehicle is serviced.

It is also conceivable for not just one transponder 12 per brake lining 4 but also a plurality of transponders 12 to be used which may then also be in an arrangement distributed in the plane of the admissible amount of wear 8 as illustrated in FIG. 2. Furthermore, it will also be possible for a plurality of passive transponders 12 to be arranged successively in the direction of wear, i.e., in a direction parallel to a center axis 24 of the brake disk 6, and to be in a form such that they respectively emit another characteristic signal, so that the instantaneous wear state of the relevant brake lining 4 can be detected on the basis of the different signals respectively fed back to the reader 14, with the absence of one of these signals indicating friction-related failure of the associated passive transponder 12 and hence that a particular amount of wear corresponding to the respective placement of this passive transponder 12 has been reached which is then not yet the maximum admissible amount of wear 8, for example. Alternatively, the passive transponders 12 could, instead of being integrated in the brake linings 4, also be arranged on the outer face thereof such that they come into frictional contact with the brake disk 6 or with an element carried along with the latter when the admissible or another amount of wear 8 is reached.

The invention claimed is:

1. An apparatus for monitoring the lining thickness of a brake lining in a friction brake on a vehicle, the apparatus comprising:
    a plurality of passive transponders provided in relation to brake lining on an outer face of the brake lining, wherein the brake lining interacts with a friction partner to cause braking, wherein the outer face is different from a friction surface of the brake lining used to apply braking force, wherein each of the plurality of passive transponders communicates via an RFID system; and a reader, included in the RFID system which receives signals sent by each of the passive transponders, wherein if a passive transponder included in the plurality of passive transponders is altered through contact with an element carried by the friction partner when a defined wear limit for the brake lining is reached such that, when illuminated by the reader in the RFID system, that passive transponder sends a signal which is altered in comparison with an expected signal sent to the reader when that passive transponder is not altered through contact with the friction partner or the element carried by the friction partner, and wherein the plurality of passive transponders are distributed on the outer surface of the brake lining in a plane that is parallel to a plane corresponding to an admissible amount of wear of the brake lining, wherein an instantaneous wear state of the brake lining is detected based on signals respectively fed back to the reader from the plurality of passive transponders, wherein the degree of wear corresponding to the respective placement of each of the plurality of transponders is detected, wherein uneven wear of the brake lining is detected based on the signals respectively fed back to the reader from the plurality of passive transponders, and wherein a signal from one of the plurality of passive transponders is precluded from being incorrectly attributed to another one of the plurality of transponders.

2. The apparatus in claim 1, wherein the plurality of passive transponders are integrated in the brake lining or fitted to the brake lining.

3. The apparatus of claim 1, wherein the vehicle is a rail vehicle.

4. The apparatus of claim 3, wherein the rail vehicle is a freight wagon without a dedicated power supply.

5. The apparatus of claim 1, wherein the reader interacts with an evaluation device which generates a wear information item indicating the wear state of the brake lining based on the signal fed back or not fed back from the plurality of passive transponders to the reader.

6. The apparatus of claim 5, further comprising a readable memory provided for storing the wear information indicating the wear state of the brake lining.

7. The apparatus of claim 5, further comprising an indicator device interacting with the evaluation device is also provided for the purpose of indicating the wear information indicating the brake lining.

8. A method for using an apparatus for monitoring the lining thickness of a brake lining in a friction brake on a vehicle, the method comprising:

activating a reader of an RFID system, wherein the RFID system includes a plurality of passive transponders provided on an outer face of the brake lining that interacts with a friction partner to cause braking, wherein the outer face is different from a friction surface of the brake lining used to apply braking force, the reader being in direct proximity to the brake lining whose amount of wear is to be examined; and generating wear information item indicating the wear state of the brake lining based on signals fed back or not fed back from the plurality of passive transponders to the reader by an evaluation device which interacts with the reader, wherein if a passive transponder included in the plurality of passive transponders is altered through contact with an element carried by the friction partner when a defined wear limit for the brake lining is reached such that, when illuminated by a reader in the RFID system, that passive transponder sends a signal which is altered in comparison with an expected signal when that passive transponder is not altered through contact with the friction partner or the element carried by the friction partner, and wherein the plurality of passive transponders are distributed on the outer face of the brake lining in a plane that is parallel to a plane corresponding to an admissible amount of wear of the brake lining, wherein an instantaneous wear state of the brake lining is detected based on signals respectively fed back to the reader from the plurality of passive transponders, wherein the degree of wear corresponding to the respective placement of each of the plurality of transponders is detected, and wherein uneven wear of the brake lining is detected based on the signals respectively fed back to the reader from the plurality of passive transponders, and wherein a signal from one of the plurality of passive transponders is precluded from being incorrectly attributed to another one of the plurality of transponders.

9. The method of claim 8, further comprising storing the wear information indicating the wear state of the brake lining provided with the plurality of passive transponders in a readable memory of the reader.

10. The method of claim 8, further comprising presenting the wear information indicating the wear state of the brake lining with the plurality of passive transponders by an indicator device.

11. A passive transponder assembly for use in monitoring the lining thickness of a brake lining in a friction brake on a vehicle, the passive transponder assembly comprising:

a plurality of passive transponders provided in relation to brake lining on an outer face of the brake lining, wherein the brake lining interacts with a friction partner to cause braking, wherein the outer face is different from a friction surface of the brake lining used to apply braking force, wherein the plurality of passive transponders communicate via an RFID system to a reader included in the RFID system, and transmit signals to the reader of the RFID system, wherein if at least one passive transponder of the plurality of passive transponders is altered through contact with an element carried by the friction partner when a defined wear limit for the brake lining is reached such that, when illuminated by the reader in the RFID system, that passive transponder sends a signal which is altered in comparison with an expected signal when that passive transponder is not altered through contact with the friction partner or the element carried by the friction partner, wherein the plurality of passive transponders are distributed on the outer face of the brake lining in a plane that is parallel to a plane corresponding to an admissible amount of wear of the brake lining, wherein an instantaneous wear state of the brake lining is detected based on signals respectively fed back to the reader from the plurality of passive transponders, wherein the degree of wear corresponding to the respective placement of each of the plurality of transponders is detected, and wherein uneven wear of the brake lining is detected based on the signals respectively fed back to the reader from the plurality of passive transponders, and wherein a signal from one of the plurality of passive transponders is precluded from being incorrectly attributed to another one of the plurality of transponders.

12. The assembly of claim 11, wherein the at least one passive transponder is integrated in the brake lining or fitted to the brake lining.

13. The assembly of claim 11, wherein the vehicle is a rail vehicle.

14. The assembly of claim 11, wherein the rail vehicle is a freight wagon without a dedicated power supply.

15. The apparatus of claim 7, wherein the indicator device includes a plurality of LED lamps that correspond to the plurality of passive transponders and are lit to represent the brake lining which has not yet been worn down to the admissible amount of wear.

16. The method of claim 10, wherein the indicator device includes a plurality of LED lamps that correspond to the plurality of passive transponders and are lit to represent the brake lining which has not yet been worn down to the admissible amount of wear.

* * * * *